(12) United States Patent
Wu

(10) Patent No.: US 11,300,224 B2
(45) Date of Patent: Apr. 12, 2022

(54) THREADED TYPE VALVE CONNECTOR

(71) Applicant: Scott Wu, Taichung (TW)

(72) Inventor: Scott Wu, Taichung (TW)

(*) Notice: Subject to any disclaimer, the term of this patent is extended or adjusted under 35 U.S.C. 154(b) by 3 days.

(21) Appl. No.: 17/015,470

(22) Filed: Sep. 9, 2020

(65) Prior Publication Data
US 2021/0180717 A1 Jun. 17, 2021

(30) Foreign Application Priority Data
Dec. 11, 2019 (TW) ................. 108145230

(51) Int. Cl.
F16K 31/50 (2006.01)
F04B 33/00 (2006.01)
F16K 15/20 (2006.01)
F16L 15/04 (2006.01)
F16L 19/02 (2006.01)
F16L 33/24 (2006.01)
B60C 29/06 (2006.01)

(52) U.S. Cl.
CPC .......... F16K 31/506 (2013.01); F04B 33/005 (2013.01); F16K 15/20 (2013.01); F16K 31/508 (2013.01); F16L 15/04 (2013.01); F16L 19/0218 (2013.01); F16L 19/0231 (2013.01); F16L 33/24 (2013.01); B60C 29/06 (2013.01); F16L 19/0206 (2013.01)

(58) Field of Classification Search
CPC ..... F16K 31/506; F16L 15/04; F16L 19/0218; F16L 19/0231; F16L 19/0206; F16L 33/24; F04B 33/005; B60C 29/06
See application file for complete search history.

(56) References Cited

U.S. PATENT DOCUMENTS

| 5,390,963 A * | 2/1995 | Namekawa ............. F16L 37/23 285/86 |
| 8,402,989 B2 * | 3/2013 | Chuang .................. B60C 29/06 137/231 |
| 8,720,475 B2 | 5/2014 | Wu |
| 9,759,337 B2 * | 9/2017 | Cassiman ............... B60C 29/06 |
| 2013/0062879 A1 | 3/2013 | Wang |

FOREIGN PATENT DOCUMENTS

| TW | 201333355 A | 8/2013 |
| TW | M478743 U | 5/2014 |
| TW | M500182 U | 5/2015 |

* cited by examiner

Primary Examiner — Daphne M Barry
Assistant Examiner — Patrick C Williams
(74) Attorney, Agent, or Firm — Karin L. Williams; Alan D. Kamrath; Mayer & Williams PC

(57) ABSTRACT

A valve connector includes a connecting member, a threaded member, a joint member, and first and second connection assemblies. The connecting member is inserted into an axial hole of the threaded member to cause an abutting portion of the connecting member to enter into the axial hole. The joint member forms two threaded sections at two opposite ends thereof. The two threaded sections are alternatively detachably connected to a threaded portion of the threaded member so that a first seal ring of the first connection assembly and a second seal ring of the second connection assembly are alternatively removably abutted against the abutting portion for connecting a Schrader valve and a Presta valve.

5 Claims, 5 Drawing Sheets

THREADED TYPE VALVE CONNECTOR

BACKGROUND OF THE INVENTION

The present invention relates to a valve connector and, more particularly, to a threaded type valve connector for Schrader valve and Presta valve.

Valve connectors that can be used for both Schrader valve and Presta valve usually have the disadvantages of large volume and complex structure, which makes it inconvenient to use. For example, a common dual-purpose valve connector has two parallel connecting holes, which are respectively suitable for connecting a Schrader valve and a Presta valve, and the connection state of the valve connector is controlled by a lever. However, this kind of connection structure is easy to loosen, and the pivoting of the lever requires a large space, which is easily affected by external objects such as spokes and is inconvenient in operation. Thus, a need exists for a novel valve connector that mitigates and/or obviates the above drawbacks.

BRIEF SUMMARY OF THE INVENTION

An objective of the present invention is to provide a threaded type dual use valve connector for Schrader valve and Presta valve.

A valve connector according to the present invention includes a connecting member, a threaded member, a joint member, a first connection assembly, and a second connection assembly. The connecting member has a first axial hole penetrating through two opposite ends thereof. The two opposite ends of the connecting member respectively form a connecting portion and an abutting portion. The connecting portion is adapted to connect an air tube of an inflation device. The threaded member has a second axial hole penetrating through two opposite ends thereof and a threaded portion formed in an inner periphery of the second axial hole. The connecting member is inserted into the second axial hole to cause the abutting portion to enter into the second axial hole. The joint member defines a first end and a second end opposite to the first end and has a third axial hole penetrating through the first and second ends. The abutting portion passes through the third axial hole to selectively enter one of the first end and the second end. The joint member forms a first threaded section at the first end and a second threaded section at the second end. The first and second threaded sections are alternatively detachably connected to the threaded portion. The third axial hole forms a first recess at the first end and a second recess at the second end. The first connection assembly is disposed at the first end and is adapted to connect a Presta valve. The first connection assembly includes a first seal ring disposed at the first recess. The first seal ring is removably abutted against the abutting portion when the first threaded section is detachably connected to the threaded portion. The second connection assembly is disposed at the second end and is adapted to connect a Schrader valve. The second connection assembly includes a second seal ring disposed at the second recess. The second seal ring is removably abutted against the abutting portion when the second threaded section is detachably connected to the threaded portion.

In an example, the connecting member forms a first shoulder portion located between the connecting portion and the abutting portion. The second axial hole includes a limiting section and a connecting section. The threaded member forms a second shoulder portion extended inward from the limiting section and abutted against the first shoulder portion. The threaded portion is formed in the connecting section.

In an example, the threaded portion is an internal thread and is formed in an inner periphery of the connecting section. The first threaded section is an external thread and is formed in an outer periphery of the first end. The second threaded section is an external thread and is formed in an outer periphery of the second end.

In an example, the first connection assembly includes a first engaging portion formed in an inner periphery of the third axial hole and adjacent to the first recess. The first engaging portion is internal thread. The first seal ring and the first engaging portion are adapted to connect a Presta valve.

In an example, the third axial hole further forms a third recess adjacent to the second recess. The second connection assembly includes a second engaging portion and an abutting member. The second engaging portion is formed in an inner periphery of the third axial hole and is adjacent to the second recess. The second engaging portion is an internal thread. The abutting member is disposed at the third recess and extends to the second engaging portion. The second seal ring is mounted around the abutting member. The second seal ring, the second engaging portion, and the abutting member are adapted to connect a Schrader valve.

In an example, the valve connector further comprises a sleeve member having a fourth axial hole penetrating through two opposite ends thereof. The connecting portion enters into the sleeve member via the fourth axial hole to be adapted to connect the air tube. The sleeve member forms a fourth shoulder portion extended inward from one end thereof and adapted to abut against the air tube.

The present invention will become clearer in light of the following detailed description of illustrative embodiments of this invention described in connection with the drawings.

DETAILED DESCRIPTION OF THE INVENTION

Figure 1:
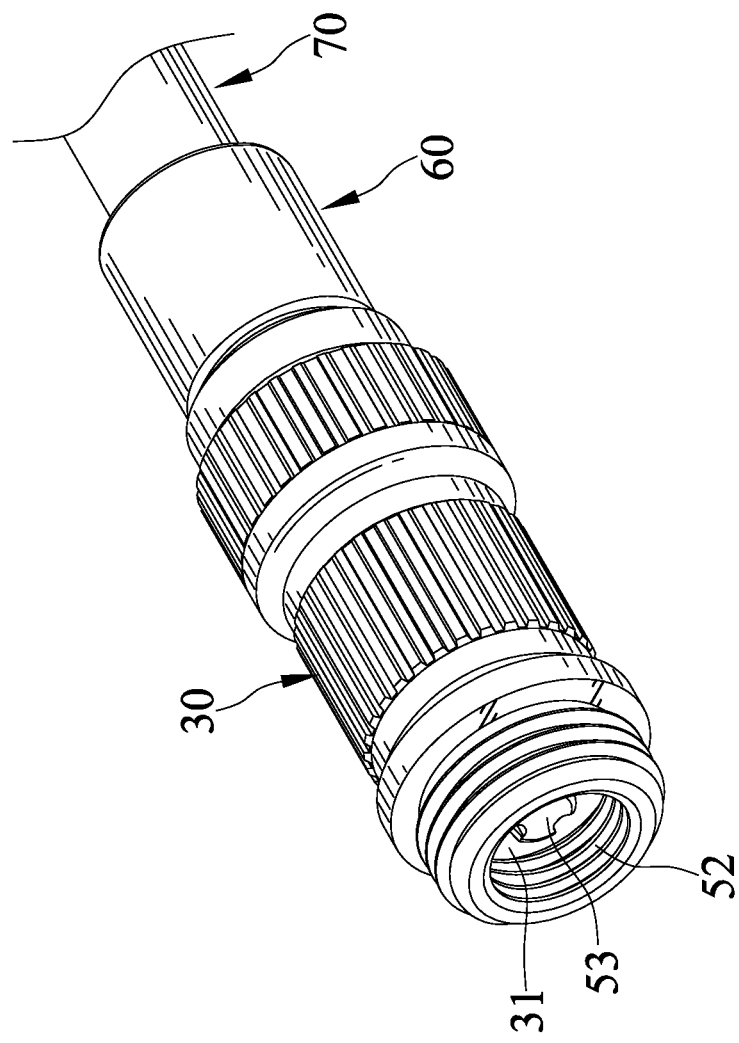
FIG. 1 is a perspective view of a threaded type valve connector of an embodiment according to the present invention.
Figure 2:
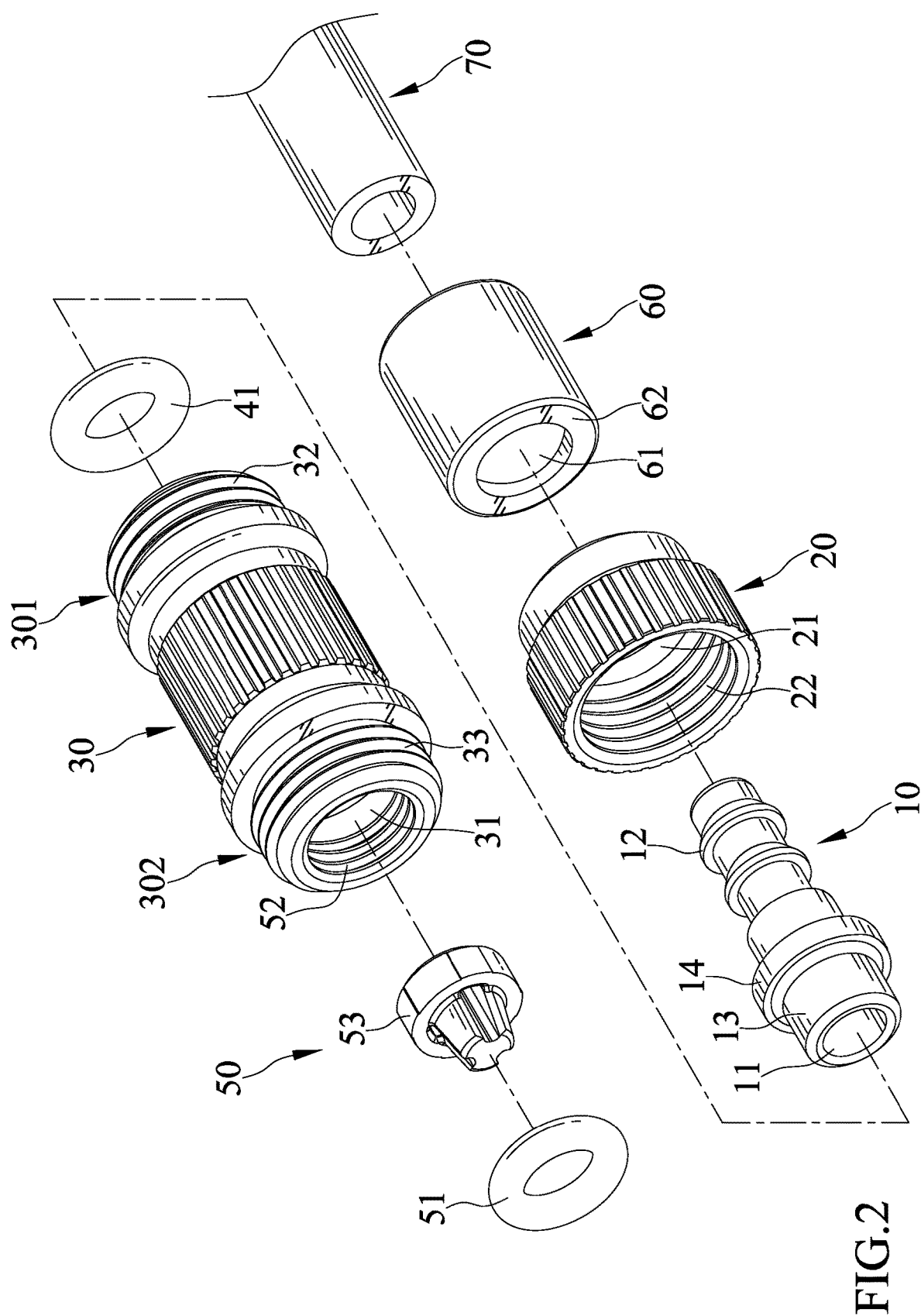
FIG. 2 is an exploded, perspective view of the threaded type valve connector of FIG. 1.
Figure 3:
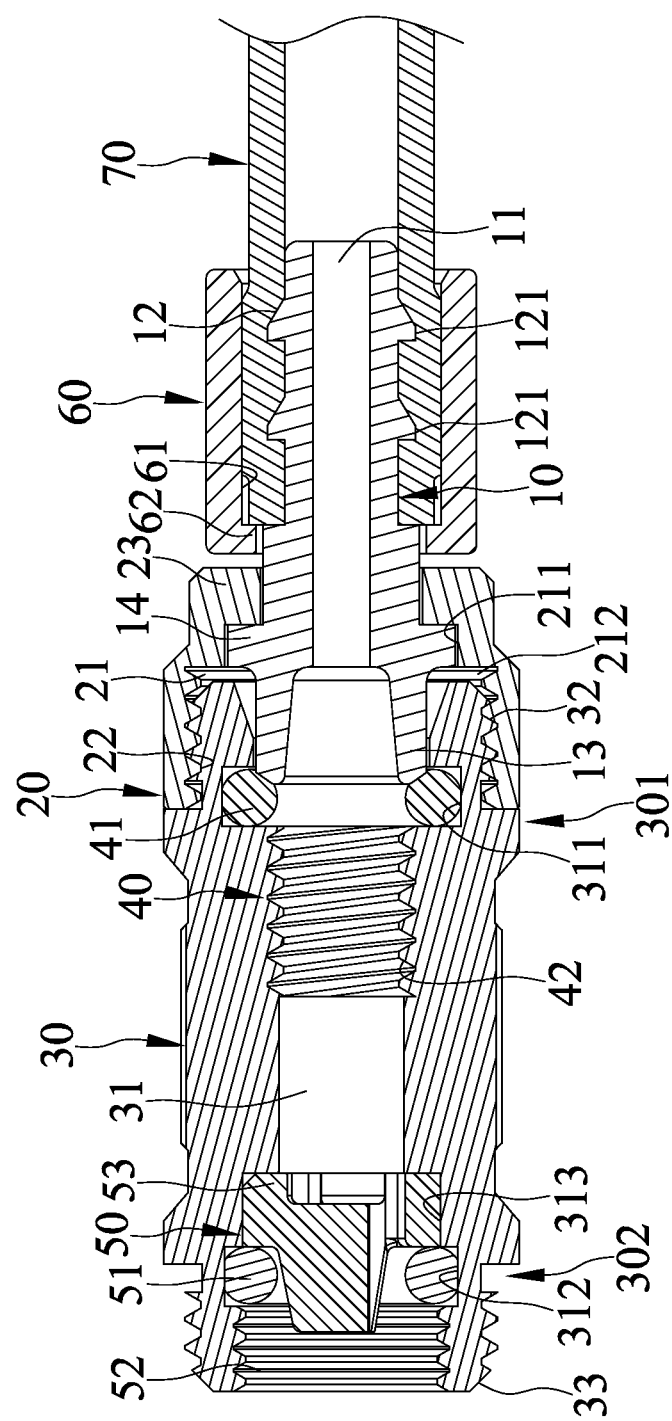
FIG. 3 is a cross sectional view of the threaded type valve connector of FIG. 1.

With reference to FIGS. 1-3, a threaded type valve connector includes a connecting member 10, a threaded member 20, and a joint member 30. The connecting member 10 is adapted to connect an air tube 70 of an inflation device such as an air pump. The threaded member 20 is rotatably connected to the connecting member 10. Two ends of the joint member 30 are alternatively detachably connected to the threaded member 20 as user need for connecting a Schrader valve SV and a Presta valve PV.

The connecting member 10 has a first axial hole 11 penetrating through two opposite ends thereof. The two opposite ends of the connecting member 10 respectively form a connecting portion 12 and an abutting portion 13. The connecting portion 12 is adapted to connect the air tube 70 to cause the first axial hole 11 interconnected with the air tube 70. In addition, a plurality of protrusions 121 are formed on an outer periphery of the connecting portion 12, and the protrusions 121 can be embedded into an inner periphery of the air tube 70 to increase the connection strength between the connecting portion 12 and the air tube 70. The connecting member 10 forms a first shoulder portion 14 located between the connecting portion 12 and the abutting portion 13, and an outer diameter of the first shoulder portion 14 is greater than that of the connecting portion 12 and the abutting portion 13.

The threaded member 20 has a second axial hole 21 penetrating through two opposite ends thereof and a threaded portion 22 formed in an inner periphery of the second axial hole 21. The connecting member 10 is inserted into the second axial hole 21 to cause the abutting portion 13 to enter into the second axial hole 21. The second axial hole 21 includes a limiting section 211 and a connecting section 212. An inner diameter of the limiting section 211 is less than that of the connecting section 212. The threaded member 20 forms a second shoulder portion 23 extended inward from the limiting section 211 and abutted against the first shoulder portion 14. The threaded portion 22 is formed in the connecting section 212. Further, the threaded portion 22 is internal thread and is formed in an inner periphery of the connecting section 212.

The joint member 30 defines a first end 301 and a second end 302 opposite to the first end 301 and has a third axial hole 31 penetrating through the first and second ends 301 and 302. Thus, the abutting portion 13 can pass through the third axial hole 31 to selectively enter one of the first and second ends 301 and 302. The third axial hole 31 forms a first recess 311 at the first end 301 and a second recess 312 at the second end 302, and the third axial hole 31 further forms a third recess 313 adjacent to the second recess 312. The joint member 30 forms a first threaded section 32 at the first end 301 and a second threaded section 33 at the second end 302. The first and second threaded sections 32 and 33 are alternatively detachably connected to the threaded portion 22. The first threaded section 32 is an external thread and is formed in an outer periphery of the first end 301, and the second threaded section 33 is an external thread and is formed in an outer periphery of the second end 302. The external threads of the first and second threaded sections 32 and 33 correspond to the internal thread of the threaded portion 22 so that the first and second ends 301 and 302 can alternatively detachably connect to the threaded member 20.

The first connection assembly 40 is disposed at the first end 301 and is adapted to connect a Presta valve PV. The first connection assembly 40 includes a first seal ring 41 disposed at the first recess 311 and a first engaging portion 42 formed in an inner periphery of the third axial hole 31 and adjacent to the first recess 311. The first engaging portion 42 is an internal thread, and the first seal ring 41 and the first engaging portion 42 are adapted to connect a Presta valve PV. The first seal ring 41 is removably abutted against the abutting portion 13 and is slightly deformed to maintain the airtightness between the connecting member 10 and the joint member 30 when the first threaded section 32 is detachably connected to the threaded portion 22.

The second connection assembly 50 is disposed at the second end 302 and is adapted to connect a Schrader valve SV. The second connection assembly 50 includes a second seal ring 51, a second engaging portion 52 and an abutting member 53. The second seal ring 51 is disposed at the second recess 312. The second engaging portion 52 is formed in an inner periphery of the third axial hole 31 and is adjacent to the second recess 312. The abutting member 53 is disposed at the third recess 313 and extends to the second engaging portion 52. The second engaging portion 52 is internal thread. The second seal ring 51 is mounted around the abutting member 53. The second seal ring 51, the second engaging portion 52, and the abutting member 53 are adapted to connect a Schrader valve SV. The second seal ring 51 is removably abutted against the abutting portion 13 and is slightly deformed to maintain the airtightness between the connecting member 10 and the joint member 30 when the second threaded section 33 is detachably connected to the threaded portion 22.

Therefore, the first seal ring 41 and the second seal ring 51 respectively correspond to the first and second threaded portions 32 and 33 being connected to the threaded portion 22 to be detachably abutted against the abutting portion 13 and to maintain the airtightness between the connecting member 10 and the joint member 30. In other words, the first seal ring 41 and the second seal ring 51 not only have the function of connecting the Presta valve PV and the Schrader valve SV, but also can maintain the airtightness between the connecting member 10 and the joint member 30. Thus, no additional seal ring is required between the connecting member 10 and the joint member 30 to achieve the effect of small size and simple structure.

The threaded type valve connector further includes a sleeve member 60. The sleeve member 60 has a fourth axial hole 61 penetrating through two opposite ends thereof. The connecting portion 12 enters into the sleeve member 60 via the fourth axial hole 61 to be adapted to connect the air tube 70. The sleeve member 60 forms a fourth shoulder portion 62 extended inward from one end thereof and adapted to abut against the air tube 70.

Figure 4:
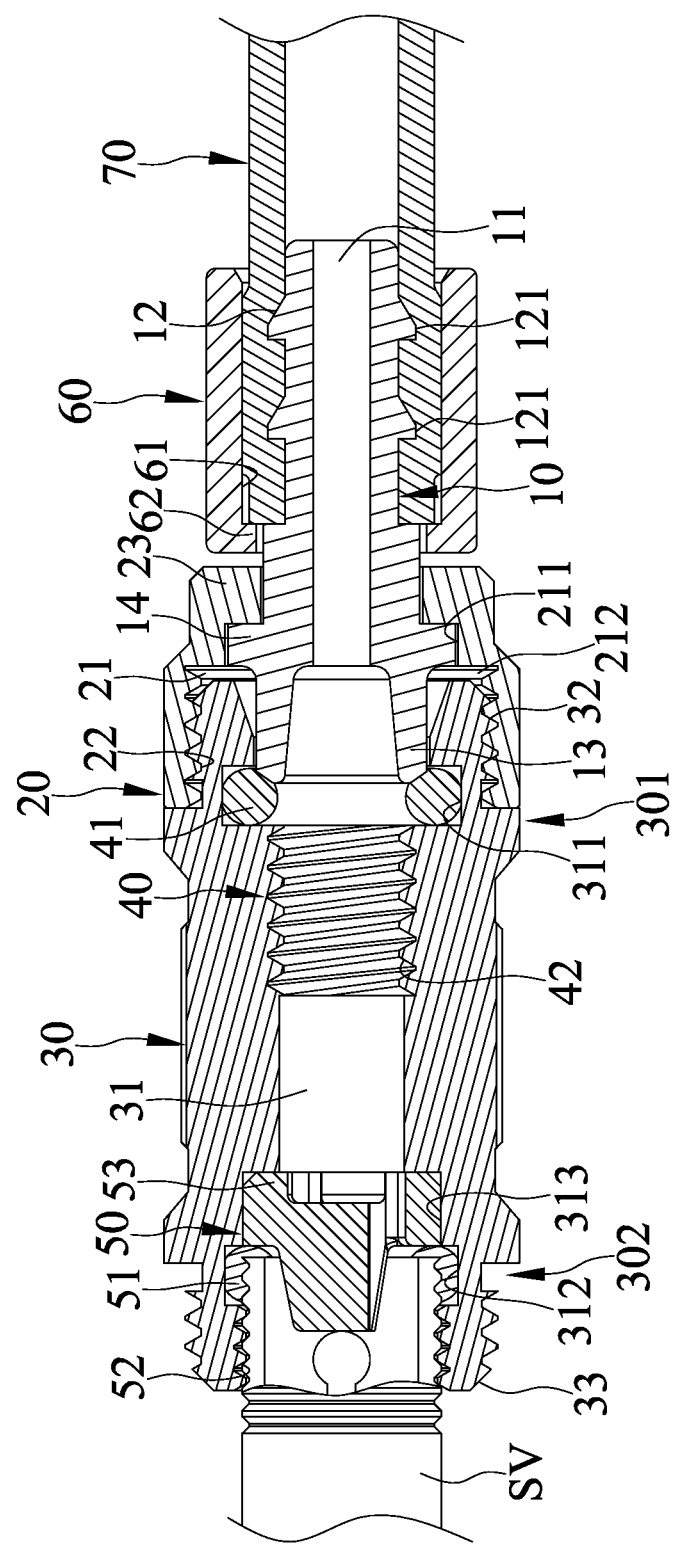
FIG. 4 is a cross sectional view of the threaded type valve connector of FIG. 1 and shows the valve connector connecting a Schrader valve.

With reference to FIG. 4, when the threaded type valve connector is to be connected to the Schrader valve SV, the first threaded section 32 is first connected to the threaded portion 22 of the threaded member 20, and the first seal ring 41 is abutted against the abutting portion 13 of the connecting member 10 to maintain the airtightness between the connecting member 10 and the joint member 30. The Schrader valve SV can be inserted into the second end 302 of the joint member 30 and is connected with the second seal ring 51, the second engaging portion 52 and the abutting member 53.

Figure 5:
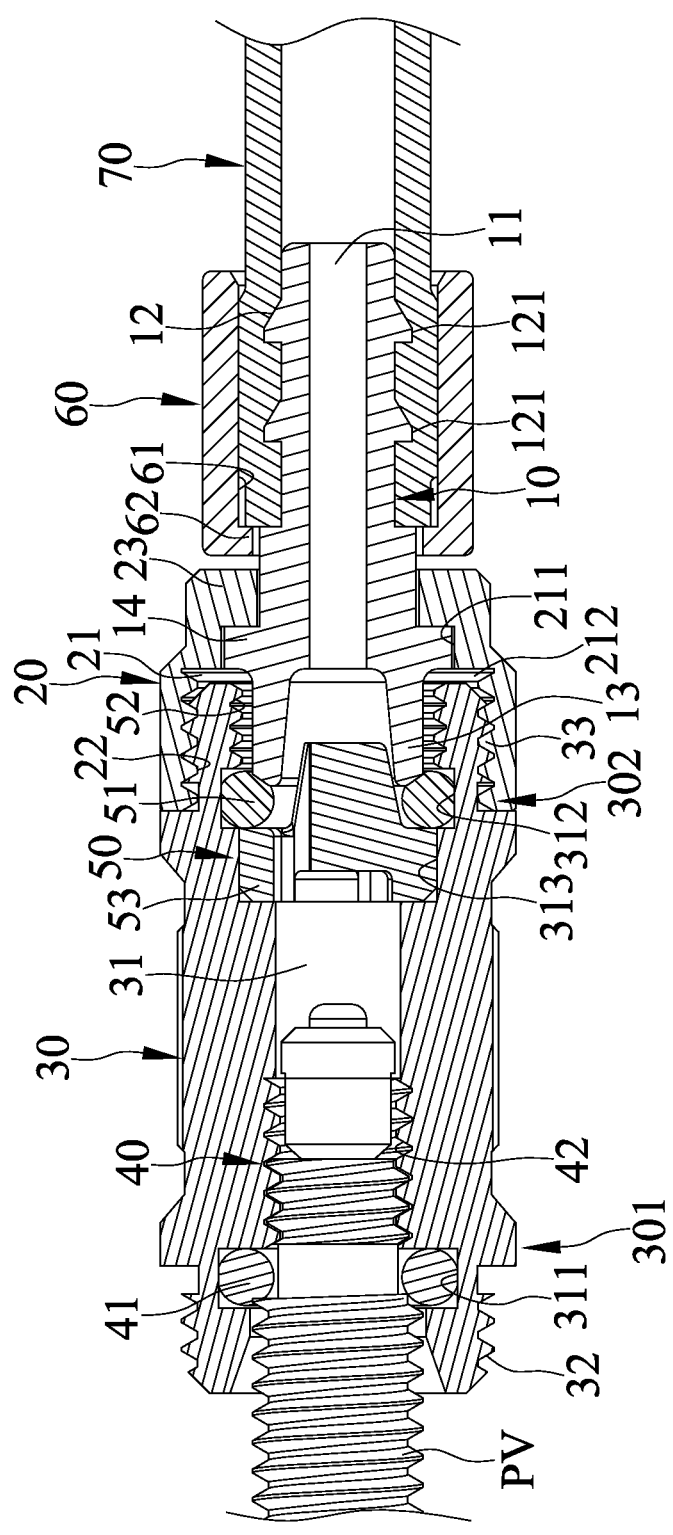
FIG. 5 is a cross sectional view of the threaded type valve connector of FIG. 1 and shows the valve connector connecting a Presta valve.

With reference to FIG. 5, when the threaded type valve connector is to be connected to the Presta valve PV, the second threaded section 33 is first connected to the threaded portion 22 of the threaded member 20, and the second seal ring 51 is abutted against the abutting portion 13 of the connecting member 10 to maintain the airtightness between the connecting member 10 and the joint member 30. The Presta valve PV can be inserted into the first end 301 of the joint member 30 and is connected with the first seal ring 41, the first engaging portion 42.

Although specific embodiments have been illustrated and described, numerous modifications and variations are still possible without departing from the scope of the invention. The scope of the invention is limited by the accompanying claims.

The invention claimed is:
1. A valve connector comprising:
    a connecting member having a first axial hole penetrating through two opposite ends thereof, wherein the two opposite ends of the connecting member respectively form a connecting portion and an abutting portion, and wherein the connecting portion is adapted to connect an air tube of an inflation device;

a threaded member having a second axial hole penetrating through two opposite ends thereof and a threaded portion formed in an inner periphery of the second axial hole, wherein the connecting member is inserted into the second axial hole to cause the abutting portion to enter into the second axial hole;

a joint member defining a first end and a second end opposite to the first end and having a third axial hole penetrating through the first and second ends, wherein the abutting portion passes through the third axial hole to selectively enter one of the first end and the second end, wherein the joint member forms a first threaded section at the first end and a second threaded section at the second end, wherein the first and second threaded sections are alternatively detachably connected to the threaded portion, wherein the third axial hole forms a first recess at the first end and a second recess at the second end;

a first connection assembly disposed at the first end and adapted to connect a Presta valve, wherein the first connection assembly includes a first seal ring disposed at the first recess, and wherein the first seal ring is removably abutted against the abutting portion when the first threaded section is detachably connected to the threaded portion; and a second connection assembly disposed at the second end and adapted to connect a Schrader valve, wherein the second connection assembly includes a second seal ring disposed at the second recess, and wherein the second seal ring is removably abutted against the abutting portion when the second threaded section is detachably connected to the threaded portion, wherein the third axial hole further forms a third recess adjacent to the second recess, wherein the second connection assembly includes a second engaging portion and an abutting member, wherein the second engaging portion is formed in an inner periphery of the third axial hole and is adjacent to the second recess, wherein the second engaging portion is internal thread, wherein the abutting member is disposed at the third recess and extends to the second engaging portion, wherein the second seal ring is mounted around the abutting member, and wherein the second seal ring, the second engaging portion, and the abutting member are adapted to connect a Schrader valve.

2. The valve connector as claimed in claim 1, wherein the connecting member forms a first shoulder portion located between the connecting portion and the abutting portion, wherein the second axial hole includes a limiting section and a connecting section, wherein the threaded member forms a second shoulder portion extended inward from the limiting section and abutted against the first shoulder portion, and wherein the threaded portion is formed in the connecting section.

3. The valve connector as claimed in claim 2, wherein the threaded portion is internal thread and is formed in an inner periphery of the connecting section, wherein the first threaded section is external thread and is formed in an outer periphery of the first end, and wherein the second threaded section is external thread and is formed in an outer periphery of the second end.

4. The valve connector as claimed in claim 1, wherein the first connection assembly includes a first engaging portion formed in an inner periphery of the third axial hole and adjacent to the first recess, wherein the first engaging portion is internal thread, and wherein the first seal ring and the first engaging portion are adapted to connect a Presta valve.

5. The valve connector as claimed in claim 1, further comprising:

a sleeve member having a fourth axial hole penetrating through two opposite ends thereof, wherein the connecting portion enters into the sleeve member via the fourth axial hole to be adapted to connect the air tube, and wherein the sleeve member forms a fourth shoulder portion extended inward from one end thereof and adapted to abut against the air tube.

* * * * *